(12) United States Patent
Chen et al.

(10) Patent No.: US 10,164,983 B2
(45) Date of Patent: Dec. 25, 2018

(54) DISTRIBUTED AUTHENTICATION FOR INTERNET-OF-THINGS RESOURCES

(71) Applicant: Verizon Patent and Licensing Inc., Arlington, VA (US)

(72) Inventors: Ming Chen, Bedford, MA (US); Zhong Chen, Acton, MA (US); Lin Zhu, Lexington, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 178 days.

(21) Appl. No.: 15/410,863

(22) Filed: Jan. 20, 2017

(65) Prior Publication Data

US 2018/0212970 A1    Jul. 26, 2018

(51) Int. Cl.
*H04L 29/06* (2006.01)
*H04L 9/08* (2006.01)

(52) U.S. Cl.
CPC .......... *H04L 63/101* (2013.01); *H04L 9/0861* (2013.01); *H04L 63/061* (2013.01); *H04L 63/062* (2013.01); *H04L 63/083* (2013.01)

(58) Field of Classification Search
CPC .................................................. H04L 63/101
See application file for complete search history.

(56) References Cited

U.S. PATENT DOCUMENTS

| | | | | |
|---|---|---|---|---|
| 9,589,397 B1* | 3/2017 | Christopher | ....... | G07C 9/00007 |
| 9,955,526 B1* | 4/2018 | Yu | ........................... | H04L 67/12 |
| 10,057,264 B1* | 8/2018 | Elnakib | ............... | H04L 63/0876 |
| 2015/0007273 A1* | 1/2015 | Lin | ......................... | H04L 63/08 |
| | | | | 726/4 |
| 2015/0312041 A1* | 10/2015 | Choi | ..................... | H04L 9/3231 |
| | | | | 713/175 |
| 2016/0044032 A1* | 2/2016 | Kim | .................... | H04L 63/0876 |
| | | | | 726/5 |
| 2016/0285628 A1* | 9/2016 | Carrer | .................... | H04L 9/3228 |
| 2016/0323257 A1* | 11/2016 | Kang | ....................... | H04L 63/08 |
| 2017/0005871 A1* | 1/2017 | Smith | ..................... | H04W 4/70 |
| 2017/0041316 A1* | 2/2017 | Setchell | .............. | H04L 63/0876 |

(Continued)

OTHER PUBLICATIONS

Liu et al.; Authentication and Access Control in the Internet of Things; Published in: 2012 32nd International Conference on Distributed Computing Systems Workshops; Date of Conference: Jun. 18-21, 2012; IEEE Xplore (Year: 2012).*

(Continued)

*Primary Examiner* — Bradley Holder

(57) ABSTRACT

A network device receives, from a node in an Internet-of-Things (IoT) network, an access request for a user authenticated via the node and identifies the access request as from either of a trusted node or an untrusted node in the IoT network. When the access request is from an untrusted node, the network device identifies a hash key for the access request, wherein the hash key is derived from an access list for the IoT network; broadcasts the hash key to other trusted nodes in the IoT network; and validates the access request based on a solution consensus from the other trusted nodes. When the access request is from a trusted node, the network device confirms mutual trust with the trusted node via an encrypted key exchange, and validates the access request based on the mutual trust with the trusted node.

20 Claims, 10 Drawing Sheets

(56) References Cited

U.S. PATENT DOCUMENTS

| | | | |
|---|---|---|---|
| 2017/0094706 A1* | 3/2017 | Kim | H04W 4/70 |
| 2017/0149792 A1* | 5/2017 | Smith | H04L 9/3263 |
| 2017/0180208 A1* | 6/2017 | Smith | H04L 41/12 |
| 2017/0180357 A1* | 6/2017 | Ghosh | H04L 63/0853 |
| 2017/0187699 A1* | 6/2017 | Gillmore | H04L 63/062 |
| 2017/0187831 A1* | 6/2017 | Otting | H04L 41/0266 |
| 2017/0350612 A1* | 12/2017 | Christopher | G05B 19/042 |

OTHER PUBLICATIONS

Hummen et al.; Towards viable certificate-based authentication for the internet of things; Published in: Proceeding HotWiSec '13 Proceedings of the 2nd ACM workshop on Hot topics on wireless network security and privacy; pp. 37-42; 2013; ACM Digital Library (Year: 2013).*

* cited by examiner

DISTRIBUTED AUTHENTICATION FOR INTERNET-OF-THINGS RESOURCES

BACKGROUND

The Internet of Things (IoT) may be described as a network of physical objects or "things" embedded with various types of electronics, software, sensors, logic, circuitry, etc., that can collect and exchange data. A "thing" (referred to herein as an "IoT device" or, alternatively, a "machine-type communication (MTC) device") may connect to a service hosted on the Internet indirectly (e.g., via another network device, such as a coordinator, a gateway, etc.) or directly. IoT technology has nearly limitless applications that can be leveraged to form new and useful services. These IoT services are distributed and managed by various control points that users can access in a variety of ways.

DETAILED DESCRIPTION OF THE PREFERRED EMBODIMENTS

Figure 1:
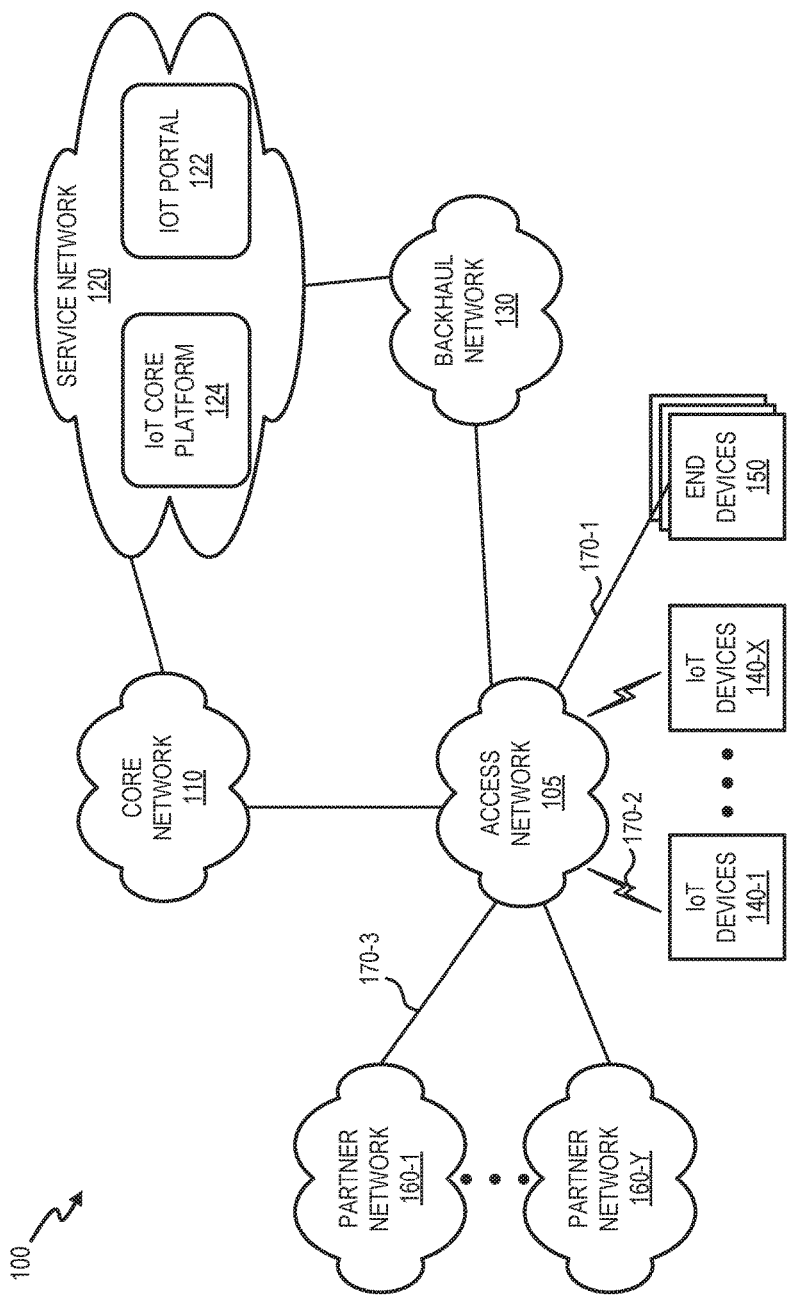
FIG. 1 is a diagram that depicts an exemplary network environment in which systems and methods described herein may be implemented.

The following detailed description refers to the accompanying drawings. The same reference numbers in different drawings may identify the same or similar elements.

Network elements that collect, store, manage, and distribute IoT-based information may generally be referred to as IoT resources. Some of these IoT resources may be accessed via calls to application programming interfaces (APIs) or through direct user interfaces, such as a portal provided by the service provider. IoT resources may be distributed and managed by various control points in a service provider's trusted network. For example, an application programming interface (API) for cloud storage may be managed by one network entity, an API for IoT connectivity may be managed by a different network entity, and an API for short message service (SMS) functions for IoT may be managed by still another network entity.

It is desirable for a service provider to give users a seamless and universal user experience to all their IoT resources. Thus, service providers seek to provide a single user authentication process to permit access to different IoT resources, regardless of how the IoT resources are accessed. However, when users access IoT resources using API calls from third-party applications, the service provider often has no control over the third-party applications' security. Various authentication protocols, such as Security Assertion Markup Language (e.g., SAML 2.0), OPEN AUTHENTICATION (e.g., OAuth1, OAuth2, etc.), OPENID, etc., may be used, and the service provider needs to be able to support various identity providers and identity protocols.

Traditional single sign-on (SSO) services are not especially useful in the context of distributed IoT resources, as users may access IoT resources managed by the service provider from different places, such as a public domain (e.g., API calls from one or more third-party apps) or a trusted private domain (e.g., portal login, etc.), and not necessarily via a single login point. Also, using a single login point presents scaling problems to manage billions of IoT resources and serve millions of customers.

Implementations herein provide distributed authentication for IoT resources that may be accessed through either public or private domains. According to one implementation, a method is performed by a network device. The network device may receive, from a node in an Internet-of-Things (IoT) network, an access request for a user authenticated via the node and may identify the access request as from either of a trusted node or an untrusted node in the IoT network. When the access request is from an untrusted node, the network device may identify a hash key for the access request, wherein the hash key is derived from an access list for the IoT network; may broadcast the hash key to other trusted nodes in the IoT network; and may validate the access request based on a solution consensus from the other trusted nodes. When the access request is from a trusted node, the network device may confirm mutual trust with the trusted node via an encrypted key exchange, and may validate the access request based on the mutual trust with the trusted node.

FIG. 1 is a diagram illustrating an exemplary environment 100 in which systems and methods described herein may be implemented. As illustrated, environment 100 may include an access network 105, a core network 110, a service network 120, and a backhaul network 130. Service network 120 may have multiple network elements including, but not limited to, an IoT portal 122 and an IoT core platform 124. Environment 100 may also include IoT devices 140-1 through 140-X (also referred to as collectively as "IoT devices 140" and, individually or generically as "IoT device 140"), end devices 150, and partner networks 160-1 through 160-Y (also referred to as collectively as "partner networks 160" and, individually or generically as "partner network 160"). For purposes of description, IoT devices 140, end devices 150, and partner networks 160 are considered network elements and a part of an IoT application framework.

As further illustrated, environment 100 includes communicative links 170 between the network elements and networks (although only three are referenced in FIG. 1 as links 170-1, 170-2, and 170-3). A network element may transmit and receive data via a link 170. Environment 100 may be implemented to include wireless and/or wired (e.g., electrical, optical, etc.) links 170. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 170 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple IoT portals 122, IoT core platforms 124, and so forth. Additionally, or alternatively, according to other embodiments, multiple network elements may be implemented on a single device, and conversely, a network element may be implemented on multiple devices. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a Third Generation (3G) RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, service network 120 includes IoT portal 122 and IoT core platform 124. According to other exemplary embodiments, IoT portal 122, IoT core platform 124, and/or a portion thereof may be implemented in core network 110.

IoT portal 122 includes one or more network devices that provide IoT management services. Users of the IoT application framework may manage (e.g., configure, issue commands, update, monitor, etc.) IoT devices 140 and other network elements (e.g., IoT data, linked data, aggregated data, etc.) via end device 150. IoT portal 122 may provide various IoT management services such that a user may manage IoT devices 140 on-the-fly and/or remotely. According to an implementation, IoT portal 124 may provide an IoT software application development service. The IoT software application development service provides access to and use of APIs that may be used to develop a software application. The software application may use an API to retrieve data collected from IoT device 140 so as to provide a service available through the software application. In another implementation, IoT portal 122 may include logic that manages and stores a subscriber profile. The subscriber profile may store data pertaining to various services offered via IoT portal 122.

IoT core platform 124 includes one or more network devices that provide advanced network services in addition to traditional services, such as Transport Control Protocol (TCP) optimization, traffic shaping, and traffic statistic collections. Additionally, IoT core platform 124 may provide IoT data services. The IoT data services may include receiving packets that are transmitted by IoT devices 140, inspecting each packet, identifying data that can be linked to IoT data carried in a packet, and aggregating the linked data. The aggregated data can be made available to users of service network 120 (e.g., via API calls from apps residing on end devices 150).

Backhaul network 130 includes one or multiple networks of one or multiple types. According to an exemplary implementation, backhaul network 130 includes a backbone network. For example, the backbone network may be implemented as an optical transport network or other suitable architecture. According to an exemplary implementation, backhaul network 130 provides a connection path to service network 120. For example, IoT device 140 may transmit IoT data to data service platform 122 via access network 105 and backhaul network 130 using a non-access stratum (NAS) control channel. According to an exemplary implementation, when access network 105 is implemented as an LTE RAN or an LTE-A RAN, backhaul network 130 may directly connect to an eNB. According to such an architecture, the IoT data transmitted using the NAS control channel may not traverse network elements of a complimentary part of core network 110.

IoT device 140 includes logic to collect, obtain, and/or generate IoT data as a part of an IoT device service. For example, IoT device 140 may be implemented to include various technologies, such as a sensor, a tag, a camera, an antenna, etc., that collects, obtains, and/or generates IoT data. IoT device 140 may include a communication interface via which IoT device 140 can transmit and receive data. For example, IoT device 140 may transmit IoT data to IoT core platform 124 as a part of an IoT data service and receive data from IoT portal 122 as a part of an IoT management service. According to another implementation, IoT device 140 may transmit IoT data to IoT core platform 124 via backhaul network 130.

End device 150 may include a communicative and computational device. End device 150 may be implemented as a mobile device, a portable device, or a stationary device. For example, end device 150 may be implemented as a smartphone, a tablet, a computer (e.g., a laptop, a desktop, a palmtop, etc.), a personal digital assistant, a terminal, and so forth. According to an exemplary embodiment, end device 150 provides users access to devices in service network 120 and/or partner networks 160. For example, end device 150 includes a client, such as a web browser or other suitable software application. In one implementation, end device 150 may include a web browser or other user interface to exchange data with IoT portal 122, IoT core platform 124, or partner networks 160. In another implementation, end device 150 may include applications that use API calls to exchange data with IoT portal 122, IoT core platform 124, or partner networks 160. Users may be considered an operator of end device 150. For example, a user may be a user of an app, a network administrator, a third party (e.g., a vendor, a merchant), and so forth. Users may use the IoT services provided by the IoT application framework described herein.

Partner network 160 may include one or more communicative and computational devices. In some implementations, partner network 160 may be included in a cloud environment that is separate from service network 120. The partner network 160 may integrate with resources in service network 120 through APIs. According to an exemplary embodiment, partner server 160 includes logic that supports IoT services. For example, partner server 160 includes logic to interpret and execute a command via an API call, which is received via the communication interface. Partner server 160 may also include logic that allows for validating the API call before performing the function or operation of the API call.

Links 170 provide communication paths between network elements and/or networks of environment 100. Links 170 may have certain characteristics, such as bandwidth capacity, transmission data rate, and the like.

Figure 2A:
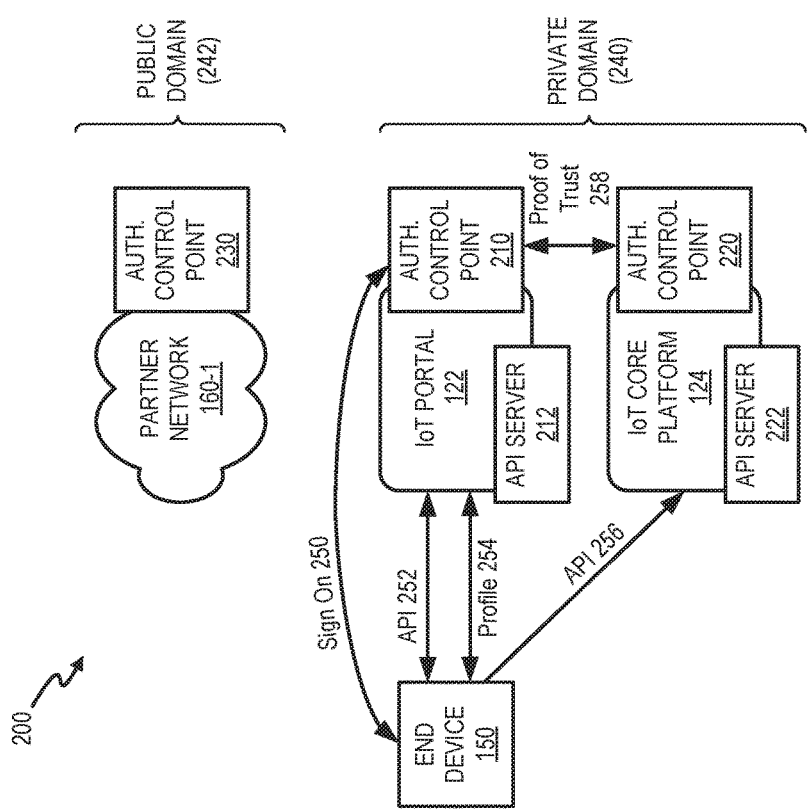
FIGS. 2A and 2B are diagrams illustrating use of distributed authentication services in a portion of the environment of FIG. 1.
Figure 2B:
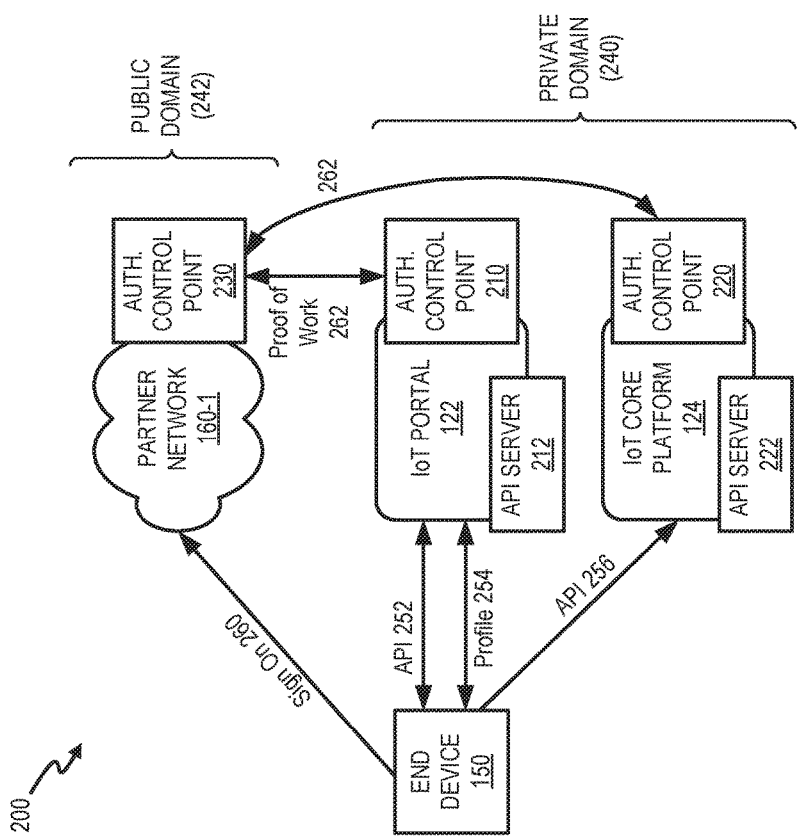

FIGS. 2A and 2B illustrate use of distributed authentication services in a portion 200 of network environment 100. As shown in FIGS. 2A and 2B, network portion 200 includes IoT portal 122, IoT core platform 124, end device 150, and partner network 160-1. IoT portal 122 includes an authentication control point 210 and an API server 212. Similarly, IoT core platform 124 includes an authentication control point 220 and an API server 222. Partner network 160-1 includes an authentication control point 230.

Referring to FIG. 2A, a user of end device 150 can access a variety of IoT resources (e.g., IoT portal 122 and IoT core platform 124) associated with service network 120 via a sign on procedure 250 using a set of enterprise credentials (such as a user name and password associated with a service of service network 120). Assuming the credentials are authenticated with, for example, authentication control point 210 of IoT portal 122, end device 150 may access APIs 252 and profile data 254 from IoT portal 122 and/or API server 212. Based on authentication procedure 250, end device 150 may also be validated for a subsequent API call to IoT core platform 124.

As described further herein, a record of sign on 250 may be accumulated in a continuously updated access list that is posted or broadcast to all control nodes (e.g., authentication control points 210, 220, and 230). End device 150 may subsequently seek access to IoT core platform 124. Instead of requiring a separate login from a user of end device 150, authentication control point 220 of IoT core platform 124 may validate the previous sign on 250 from authentication control point 210. Particularly, as nodes within private domain 240, authentication control points 210 and 220 may exchange a proof of trust 258, such as an encrypted token exchange.

Referring to FIG. 2B, a user of end device 150 can initially authenticate with partner network 160-1 via a sign on procedure 260 using the same set of enterprise credentials (such as a user name and password associated with a service of service network 120) used for sign on procedure 250 in FIG. 2A. For example, a user may provide credentials to authentication control point 230 of partner network 160-1 for a third-party application integrated with API calls for IoT portal 122 and IoT core platform 124. Based on sign on procedure 260, end device 150 may also be validated for a subsequent API call to IoT portal 122 and IoT core platform 124. Instead of requiring a separate login from a user of end device 150, authentication control points 210 and 220 may validate the previous sign on 260 from authentication control point 230. Particularly, as an exchange between public domain 242 and private domain 240, authentication control point 230 may provide a proof of work 262, such as a hashing computation of the access list that is verified by consensus of control nodes. Once verified, end device 150 is authorized to access APIs 252 and profile data 254 from IoT portal 122 and/or APIs 256 from IoT core platform 124.

Figure 3:
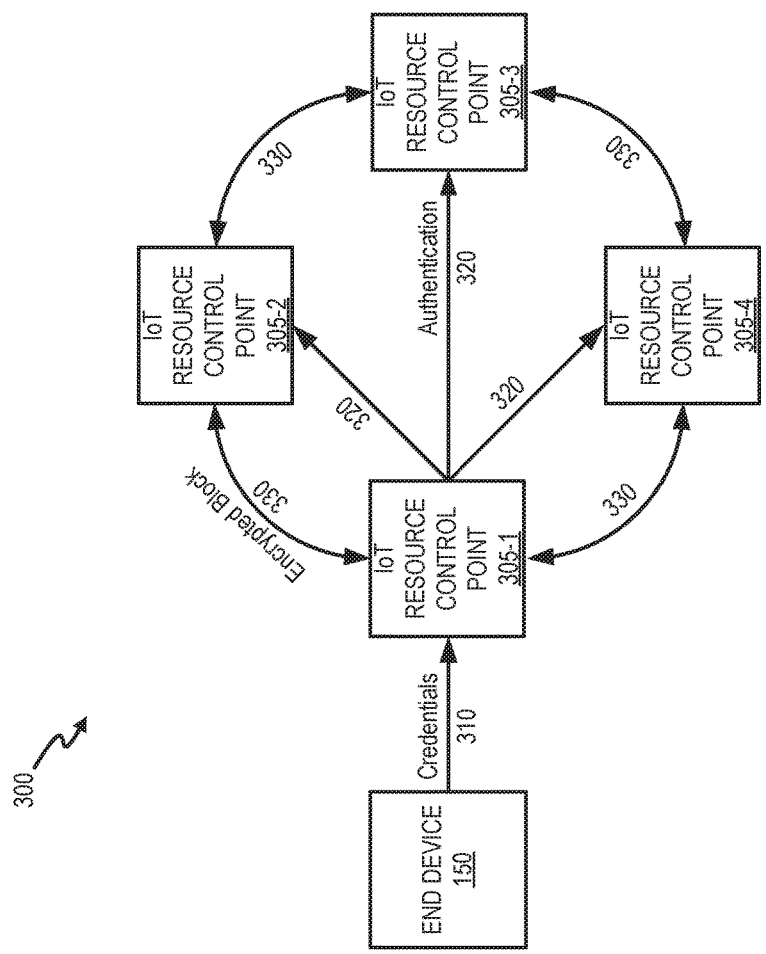
FIG. 3 is a diagram illustrating communications in an IoT network to build a chain of trust for distributed authentication services.

FIG. 3 illustrates communications in an IoT network 300 to build a chain of trust for distributed authentication services. As shown in FIG. 3, IoT network 300 may include end device 150 and multiple IoT resource control points 305-1 through 305-4 (referred to collectively as "IoT resource control points 305" and generically as "IoT resource control point 305"). Some of IoT resource control points 305 may correspond to, for example, an authentication control point for a node in a trusted domain (e.g., authentication control point 210, 220) and other IoT resource control points 305 may correspond to an authentication control point for a node in a public domain (e.g., authentication control point 230).

In IoT network 300, a chain of trust is built among IoT resource control points 305. As shown in FIG. 3, end device 150 may provide credentials 310 to access one of the IoT resources (e.g., an API server) associated with an IoT resource control point 305. More particularly, a user of end device 150 may provide initial login input to an IoT resource that communicates with an identity provider (such as IoT resource control points 305-1) to authenticate the user. IoT resource control point 305-1 may authenticate the user based on credentials 310. Each authentication 320 is posted to IoT network 300 (e.g., broadcast from receiving IoT resource control point 305-1 to each other IoT resource control point 305-2 to 305-4) and each node (i.e., each of IoT resource control points 305) will validate the authentication using known algorithms.

Each IoT resource control point 305 maintains a continuously-growing list of records referred to herein as an "access list," which is secured from tampering and revision. Any authentication from a trusted node will be added into an access list. Each version of the access list contains a timestamp and a link to a previous version of the access list. The authentication is added in chronological order to the access list and the access list is presented to each of IoT resource control points 305 as an encrypted block 330. Thus, encrypted block 330 may be encrypted and broadcast to every node in the network.

As described herein, each version of the access list is a node in a hash tree structure for efficiency. This hash tree ensures that data blocks received from other nodes in IoT network 300 are received undamaged and unaltered, and enables IoT network 300 to check that the other nodes do not send fraudulent or inaccurate blocks.

In network 300, IoT resource control points 305 in the same private domain (e.g., private domain 240) may be considered trusted nodes, while IoT resource control points 305 outside that private domain (e.g., public domain 242) may be considered untrusted nodes. According to implementations described herein, authentications can be verified using a combination of "proof of trust" among trusted nodes and "proof of work" among untrusted nodes.

Figure 4:
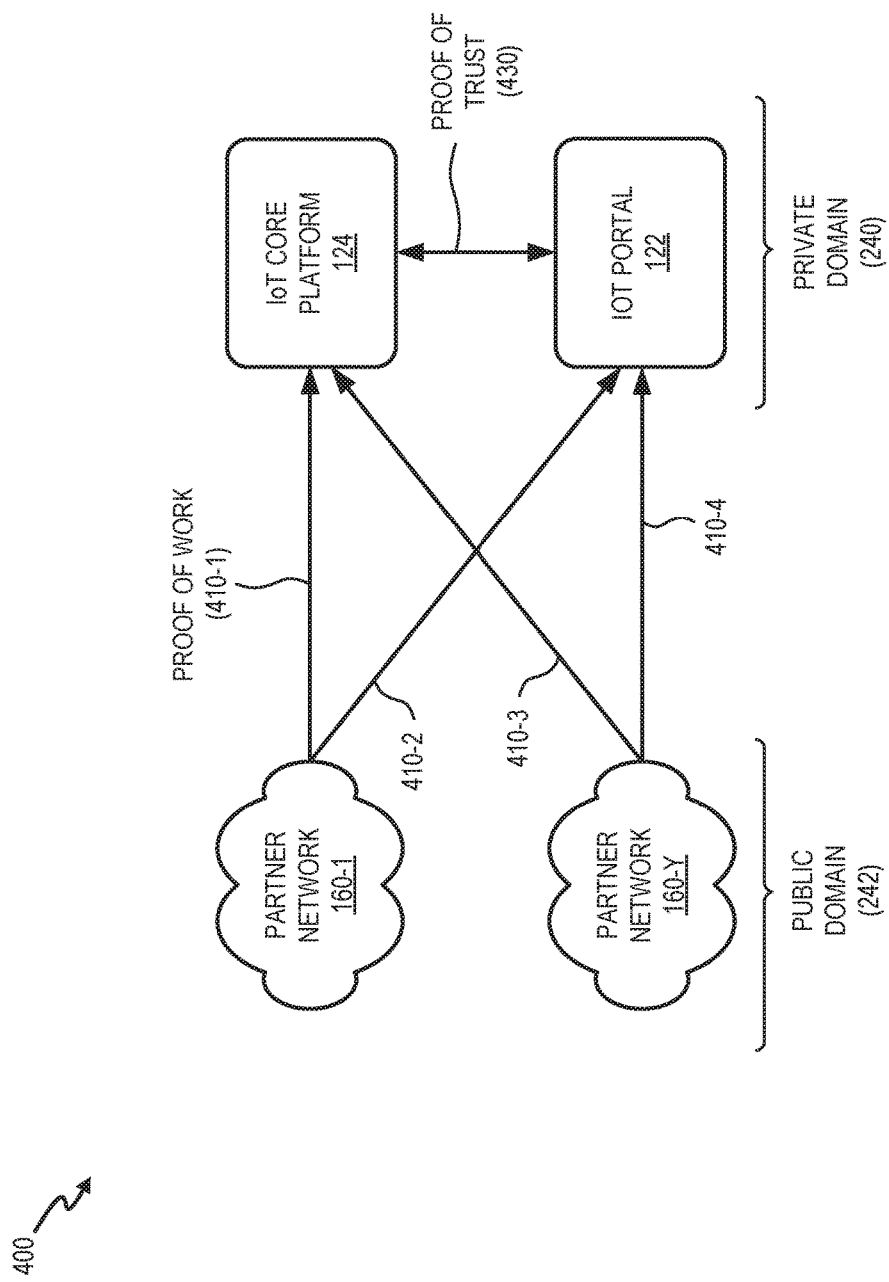
FIG. 4 is a diagram illustrating use of "proof of trust" and "proof of work" in a portion of the network environment of FIG. 1.

FIG. 4 illustrates use of "proof of trust" and "proof of work" in a portion 400 of network environment 100. Network portion 400 may include IoT portal 122, IoT core platform 124, and partner networks 160-1 and 160-2. IoT portal 122 and IoT core platform 124 (as part of service network 120) may be considered trusted nodes within a private domain (e.g., private domain 240). Partner networks 160-1 and 160-2 may be considered untrusted nodes in a public domain (e.g., public domain 242). Among the trusted nodes, token-based authentications (e.g., OAuth key exchange, etc.) can be used as proof of trust 430. Among untrusted nodes, proof of work 410, a hashing computation similar to blockchain mining, can be used.

Generally, hashing is hard to compute and easy to verify. So for external verification, implementations described herein use proof of work 410 to verify authentications from nodes in untrusted domains, where participating nodes work to solve difficult hashing problems, which the rest of network can then verify. Because it takes real-world computation resources to find solutions to the hashing problems, proof of work is able to use the difficulty of solving hashing function to measure how much of the network agrees on the current state. The only way to hack into the network would be to control a majority of the total computing power (e.g., CPU, memory, or bandwidth) to, for example, pretend the group of nodes disagrees with itself.

The number of components and the configuration (e.g., connection between components) shown in FIGS. 1 through 4 are exemplary and provided for simplicity. According to other implementations, network environment 100 may include additional components, fewer components, different components, and/or differently-arranged components than those illustrated in the figures above. For example, more than two nodes may, and likely will, be included in each of private domain 240 and public domain 242.

Figure 5:
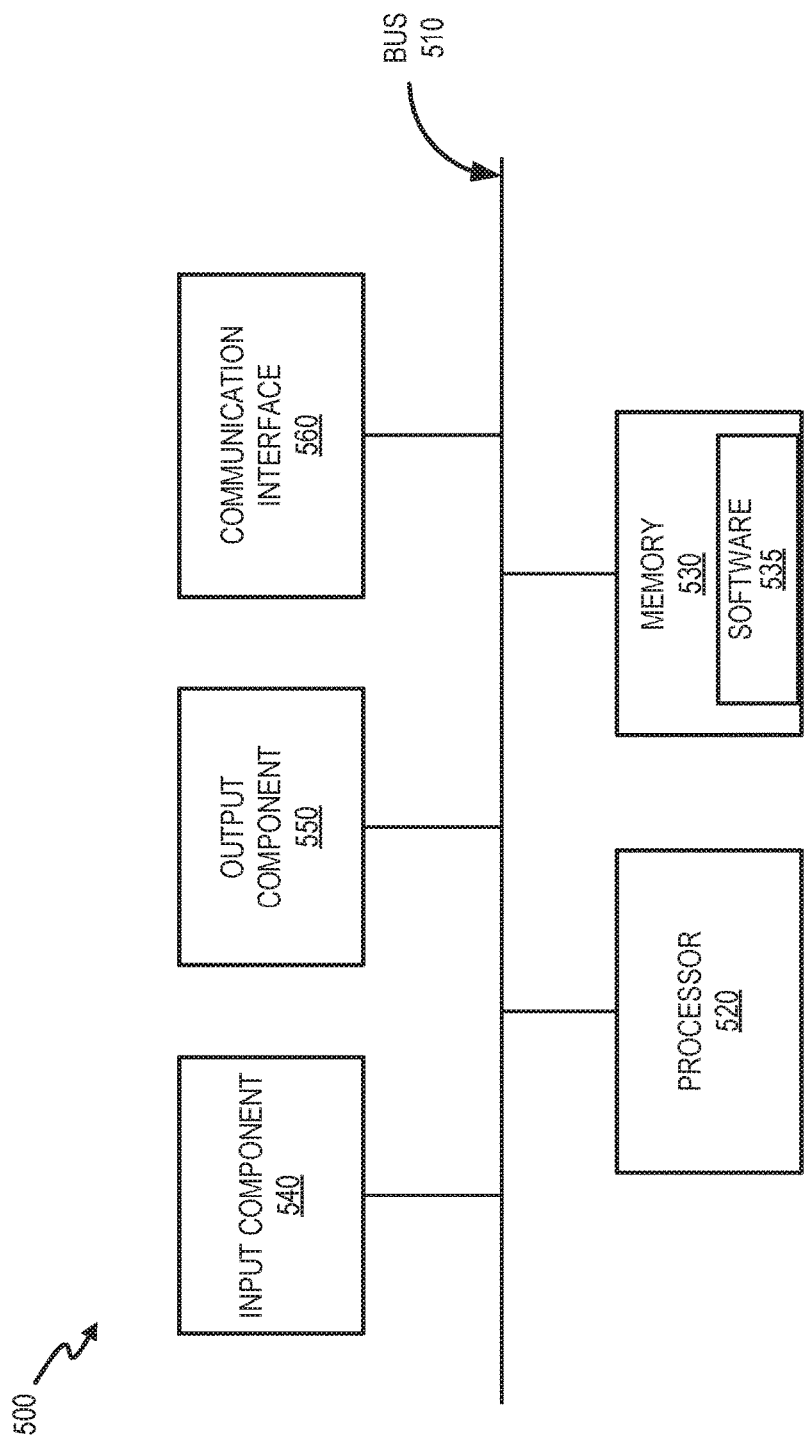
FIG. 5 is a diagram illustrating exemplary components of a device that may correspond to the network elements and an end device depicted in the environment of FIG. 1.

FIG. 5 is a diagram illustrating exemplary physical components of a device 500. Device 500 may correspond to each of the network elements, end devices 150, and/or server devices 160 depicted in environment 100. Device 500 may include a bus 510, a processor 520, a memory 530, an input component 540, an output component 550, and a communication interface 560.

Bus 510 may include a path that permits communication among the components of device 500. Processor 520 may include a processor, a microprocessor, or processing logic that may interpret and execute instructions. Memory 530 may include any type of dynamic storage device that may store information and instructions, for execution by processor 520, and/or any type of non-volatile storage device that may store information for use by processor 520.

Software 535 includes an application or a program that provides a function and/or a process. Software 535 is also intended to include firmware, middleware, microcode, hardware description language (HDL), and/or other form of instruction. By way of example, with respect to the network elements that include logic to provide proof of work authentication, these network elements may be implemented to include software 535. Additionally, for example, end device 150 may include software 535 (e.g., an application to communicate to IoT portal 124, etc.) to perform tasks as described herein.

Input component 540 may include a mechanism that permits a user to input information to device 500, such as a keyboard, a keypad, a button, a switch, etc. Output component 550 may include a mechanism that outputs information to the user, such as a display, a speaker, one or more light emitting diodes (LEDs), etc.

Communication interface 560 may include a transceiver that enables device 500 to communicate with other devices and/or systems via wireless communications, wired communications, or a combination of wireless and wired communications. For example, communication interface 560 may include mechanisms for communicating with another device or system via a network. Communication interface 560 may include an antenna assembly for transmission and/or reception of RF signals. In one implementation, for example, communication interface 560 may communicate with a network and/or devices connected to a network. Alternatively or additionally, communication interface 560 may be a logical component that includes input and output ports, input and output systems, and/or other input and output components that facilitate the transmission of data to other devices.

Device 500 may perform certain operations in response to processor 520 executing software instructions (e.g., software 535) contained in a computer-readable medium, such as memory 530. A computer-readable medium may be defined as a non-transitory memory device. A non-transitory memory device may include memory space within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Device 500 may include fewer components, additional components, different components, and/or differently arranged components than those illustrated in FIG. 5. As an example, in some implementations, a display may not be included in device 500. In these situations, device 500 may be a "headless" device that does not include input component 540. As another example, device 500 may include one or more switch fabrics instead of, or in addition to, bus 510. Additionally, or alternatively, one or more components of device 500 may perform one or more tasks described as being performed by one or more other components of device 500.

Figure 6:
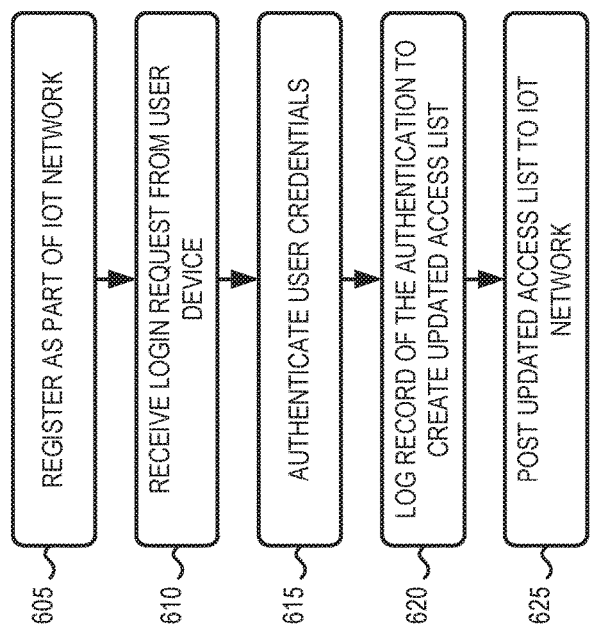
FIG. 6 is a flow diagram illustrating an exemplary process for generating an updated access list an IoT network.

FIG. 6 is a flow diagram illustrating an exemplary process 600 for generating an updated access list in an IoT network. In one implementation, process 600 may be implemented by an IoT resource control point 305. In another implementation, process 600 may be implemented by an IoT resource control point 305 in conjunction with one or more other devices in network portion 200.

Process 600 may include registering as part of an IoT network (block 605). For example, IoT resource control point 305 (e.g., associated with any of IoT portal 122, IoT core platform 124, or partner networks 160) may be registered within IoT network 300.

Process 600 may also include receiving a login request from a user device (block 610), and authenticating the user based on the credentials (block 615). For example, IoT resource control point 305 (e.g., authentication control point 230) may receive a login request (e.g., sign on 260) that includes credentials of a user. IoT resource control point 305 may authenticate the user by confirming, for example, that a user name and password match a stored profile record.

Process 600 may also include logging a record of the authentication to create an updated access list (block 620), and posting the updated access list to the IoT network (block 625). For example, IoT resource control point 305 (e.g., authentication control point 230) may update an access list with the new authentication record and add to the updated access list a timestamp and link to the previous version of the access list. The updated access list may be broadcast to all other nodes (e.g., IoT resource control points 305) in IoT network 305.

Figure 7:
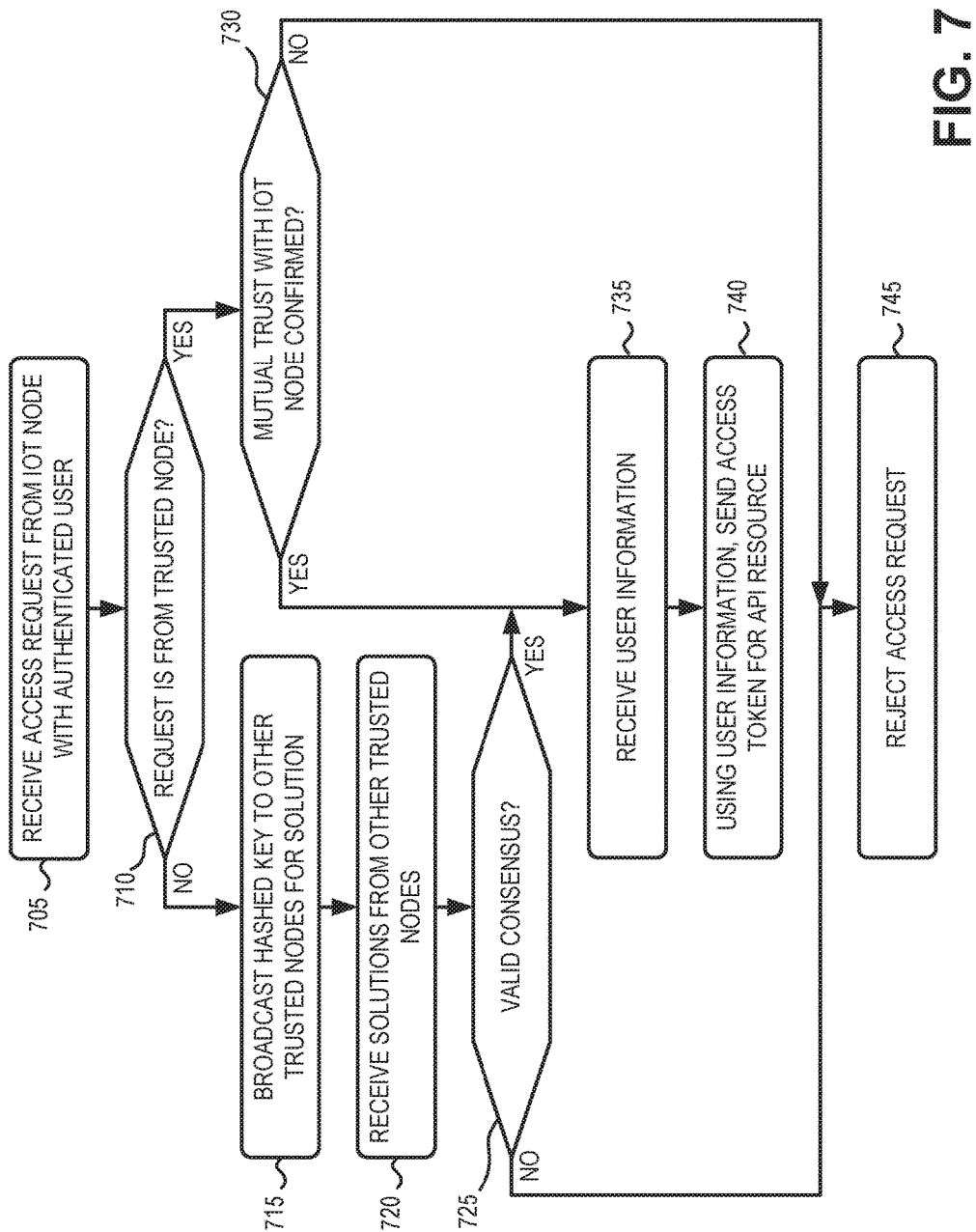
FIG. 7 is a flow diagram illustrating an exemplary process for performing distributed authentication in an IoT network.

FIG. 7 is a flow diagram illustrating an exemplary process 700 for performing distributed authentication in an IoT network. In one implementation, process 700 may be implemented by one or more devices in private domain 240. In another implementation, process 700 may be implemented by one or more devices in private domain 240 in conjunction with a device in public domain 242.

Process 700 may include receiving an access request from a node in an IoT network with an authenticated user (block 705), and identifying if the request is from a trusted node (block 710). For example, a user (or app) of user device 150 may login to an IoT resource in a trusted network (e.g., IoT portal 122 or IoT core platform 124) or an IoT resource in an untrusted network (e.g., partner network 160-1 or 160-2). After locally authenticating the user, device 150 may require access to an additional IoT resource and redirect the user credentials to another IoT resource in the trusted network (e.g., IoT portal 122 or IoT core platform 124). The login credentials may be directed to an authentication control point (e.g., authentication control point 210 or 220), which may determine whether the login request is from a trusted node (e.g., from IoT portal 122 or IoT core platform 124) or from an untrusted node (e.g., from partner network 160-1 or 160-2).

If the request is not from a trusted node (block 710—NO), process 700 may include broadcasting a hash key to other trusted nodes in the IoT network (block 715), receiving solutions from the other trusted nodes (block 720), and determining if there is a consensus for validation of the access request (block 725). For example, when the access request is from an untrusted node, authentication control point 210 of IoT portal 122 may broadcast an access list as an encrypted block in a blockchain in to other nodes in trusted domain 242 (e.g., authentication control point 220, etc.). Each node the trusted domain 242 may perform, for example, a mining operation or another proof of work to verify the access list. The proof of work solutions from the trusted nodes may be compared and determined if there is a consensus.

If the request is from a trusted node (block 710—YES), process 700 may include confirming if there is mutual trust with the node (block 730). For example, when the access request is from a trusted node, authentication control point 210 of IoT portal 122 may perform an encrypted token exchange with authentication control point 220 of IoT core platform 124 to validate a request from IoT portal 122 to IoT core platform 124.

If there is a consensus for validation of the access request (block 725—YES) or if there is mutual trust with the IoT node (block 730—YES), process 700 may include receiving user information (block 735) and using the user information to send an access token for an IoT resource associated with the request (block 740). For example, either authentication control point 210 or authentication control point 220 may receive user information from the validated node and forward an access token to allow interaction with a respective IoT resource (such as API server 212 or 222).

If there is not a consensus for validation of the access request (block 725—NO) or if there is no mutual trust with the IoT node (block 730—NO), process 700 may include rejecting the access request (block 745). For example, authentication control point 210 or authentication control point 220 may deny the access request if the access request from an untrusted node public domain 242 is not validated or if there is no mutual trust confirmed between nodes in private domain 240.

Figure 8:
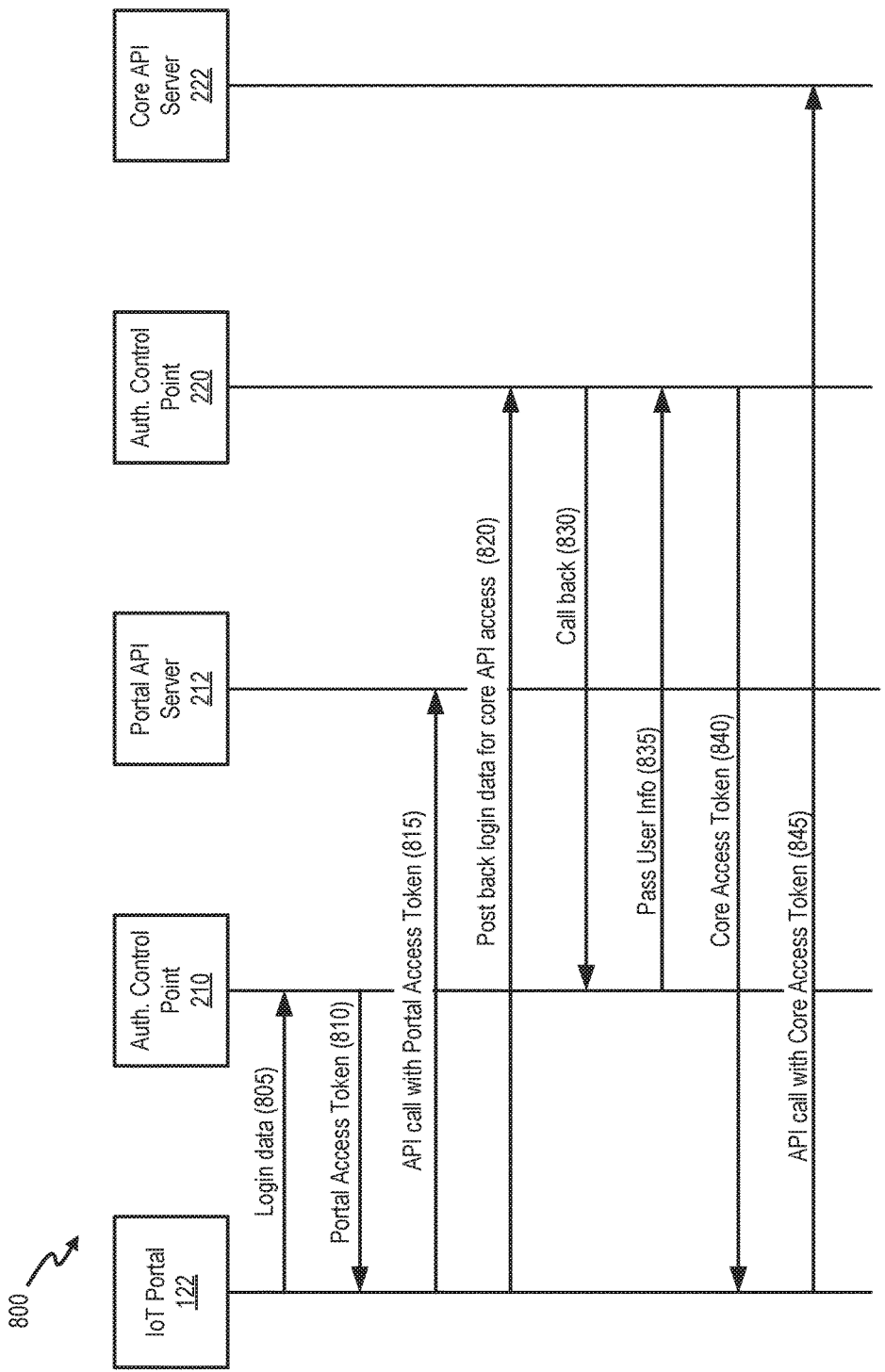
FIG. 8 is a diagram illustrating exemplary communications between devices in a portion the network environment of FIG. 1.

FIG. 8 is a diagram illustrating exemplary communications between devices in a portion 800 of network environment 100. Communications in FIG. 8 may represent communications for authentication to access distributed IoT resources for nodes in a trusted network. As shown in FIG. 8, network portion 800 may include IoT portal 122, authentication control point 210, API server 212, authentication control point 220, and API server 222. IoT portal 122, authentication control point 210, API server 212, authentication control point 220, and API server 222 may include functionality described above in connection with, for example, FIGS. 1-7.

As shown in FIG. 8, IoT portal 122 may receive user login data for an access client accessing IoT portal 122 and redirect login request 805 to authentication control point 210 for IoT portal 122. Assuming there is no current session for the user and that the credentials in the login data are valid, authentication control point 210 may authenticate the user and issue to IoT portal an access token 810 for portal API server 212. A subsequent request or API call from the user, originating through IoT portal 122, may use the portal access token, as indicated by reference 815.

Sometime after redirecting login request 805, the user may need another request or API call associated with IoT core platform 124 (not shown in FIG. 8). As shown by reference 820 of FIG. 8, IoT portal 122 may post back the user login data (used for IoT portal 122) to authentication control point 220 of IoT core platform 124. Authentication control point 220 may confirm mutual trust with authentication control point 210 (e.g., via key exchanges using OAuth protocols) and may validate the login credentials. For example, authentication control point 220 may provide a call back 830 to authentication control point 210. Assuming mutual trust is confirmed, authentication control point 210 may respond to call back 830 by passing user information for the access client using IoT portal 122, as shown by reference 830. Authentication control point 220 may receive the user information and may generate an access token for core API server 222. Authentication control point 220 may issue to IoT portal 122 core access token 840 for core API server 222. A subsequent request or API call from the user to core API server 222, originating through IoT portal 122, may use the core access token, as indicated by reference 845.

Figure 9:
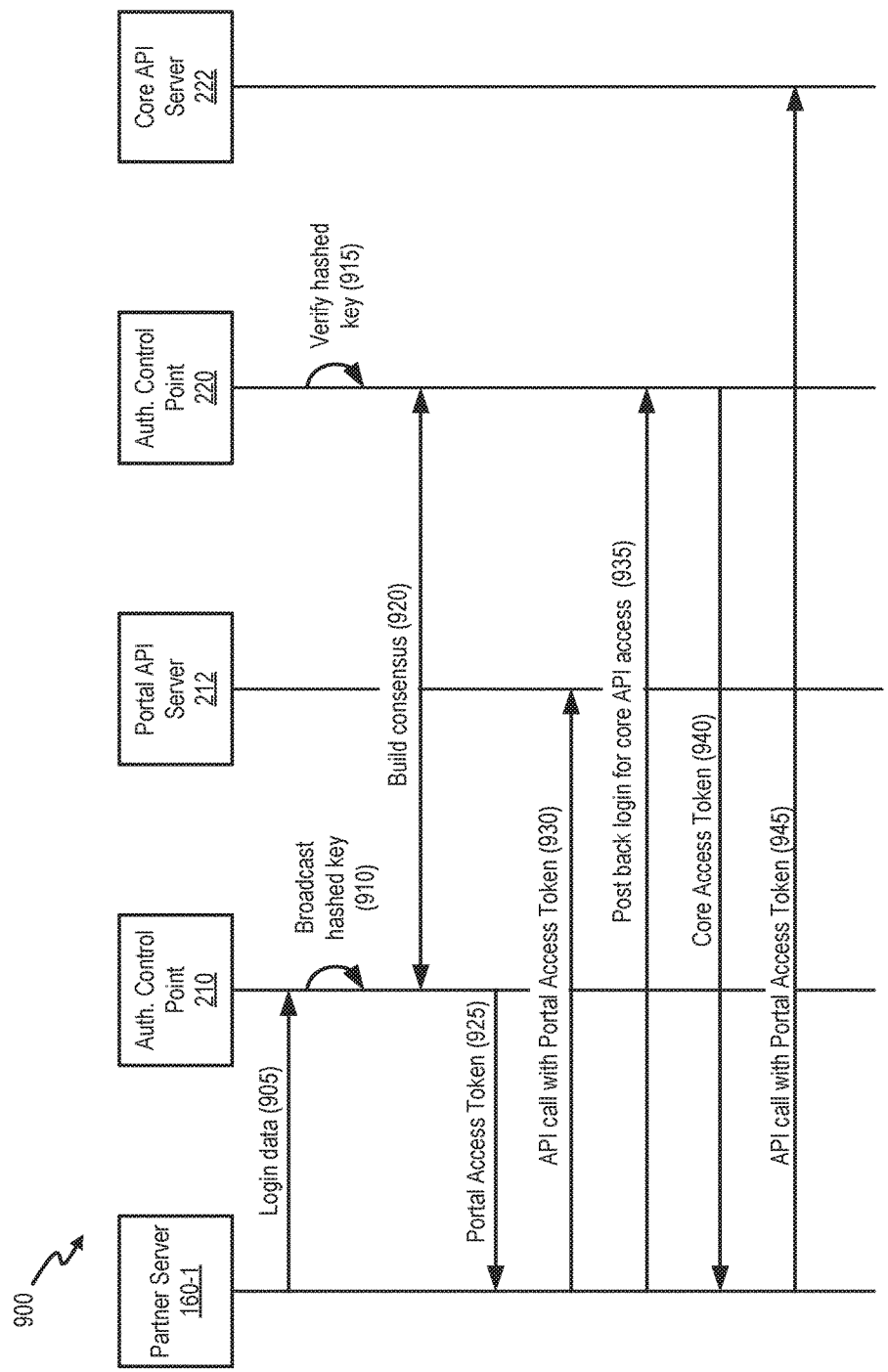
FIG. 9 is a diagram illustrating exemplary communications between devices in another portion the network environment of FIG. 1.

FIG. 9 is a diagram illustrating exemplary communications between devices in a portion 900 of network environment 100. Communications in FIG. 9 may represent communications for authentication to access distributed IoT resources for nodes in a trusted network. As shown in FIG. 9, network portion 900 may include partner server 160-1, authentication control point 210, API server 212, authentication control point 220, and API server 222. Partner server 160-1, authentication control point 210, API server 212, authentication control point 220, and API server 222 may include functionality described above in connection with, for example, FIGS. 1-8.

Referring to FIG. 9, partner server 160-1 may receive user login data and locally authenticate a user. Partner server 160-1 may need to access resources within the trusted domain 240 at IoT portal 122 and may redirect login request 905 to authentication control point 210 of IoT portal 210. Assuming there is no current session for the user, authentication control point 210 may initially fail to validate the session and may broadcast 910 a hashed key of the access list to all other nodes in trusted domain 240 (e.g., authentication control point 220 in the example of FIG. 9). The trusted nodes (including authentication control point 220) may compute a hashing problem (e.g., mining) to verify the hashed key, as indicated in reference 915. Results from trusted nodes may be exchanged to determine a consensus 920. Assuming there is a consensus of the trusted nodes to validate login request 905, authentication control point 210 may issue to IoT portal an access token 925 for portal API server 212. A subsequent request or API call from the user, originating through partner server 160-1, may use the portal access token, as indicated by reference 930.

Sometime after redirecting login request 905, the user connected through partner server 160-1 may need a request or API call associated with IoT core platform 124 (not shown in FIG. 9). As shown by reference 935 of FIG. 9, partner server 160-1 may post back the user login data (that was previously provided to authentication control point 210) to authentication control point 220 of IoT core platform 124. Authentication control point 220 may rely on consensus 920 within the session time interval to confirm mutual trust with authentication control point 210 and may validate the login credentials. Authentication control point 220 may respond to the login information by generating an access token for core API server 222. Authentication control point 220 may send to partner server 160-1 core access token 940 for core API server 222. A subsequent request or API call from the user to core API server 222, originating through partner server 160-1, may use the core access token, as indicated by reference 945

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6 and 7, and message/operation flows with respect to FIGS. 8 and 9, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a network device, the method comprising:
   receiving, by the network device and from a node in an Internet-of-Things (IoT) network, an access request for a user authenticated via the node;
   identifying the access request as from either of a trusted node or an untrusted node in the IoT network;
   when the access request is identified as from an untrusted node:
   identifying a hash key for the access request, wherein the hash key is derived from an access list for the IoT network,
   broadcasting the hash key to other trusted nodes in the IoT network,
   validating the access request based on a solution consensus from the other trusted nodes, and
   providing, to the untrusted node, an access token for a user device to access a requested resource within a private domain, after validating the access request based on the solution consensus; and
   when the access request is identified as from a trusted node:
   confirming mutual trust with the trusted node via an encrypted key exchange,
   validating the access request based on the mutual trust with the trusted node, and
   providing, to the trusted node, the access token for the user device to access the requested resource within the private domain, after validating the access request based on the mutual trust.

2. The method of claim 1, wherein the network device includes a computing device within a private domain.

3. The method of claim 1, further comprising:
   registering the network device as part of the IoT network;

receiving, from a user device, a login request, wherein the login request includes credentials of the user;
authenticating the user based on the credentials;
logging a record of the authenticating to create an updated access list; and
posting the updated access list to the IoT network.

4. The method of claim 3, wherein the access list includes a timestamp and a link to a previous version of the access list.

5. The method of claim 1, wherein the IoT network includes a combination of nodes in a private domain and other nodes in a public domain.

6. The method of claim 1, further comprising:
receiving, at the requested resource within the private domain, an access request from the untrusted node, wherein the access request includes the access token.

7. The method of claim 1, further comprising:
receiving, at the requested resource within the private domain, an access request from the user device, wherein the access request includes the access token.

8. The method of claim 1, wherein, when the node authenticates the user, the node uses a first authentication protocol, and
wherein the encrypted key exchange uses a second authentication protocol that is different than the first authentication protocol.

9. One or more network devices, comprising:
one or more memory devices for storing instructions; and
one or more processors configured to execute the instructions to:
receive, from a node in an Internet-of-Things (IoT) network, an access request for a user authenticated via the node;
identify the access request as from either of a trusted node or an untrusted node in the IoT network;
when the access request is identified as from an untrusted node:
identify a hash key for the access request, wherein the hash key is derived from an access list for the IoT network,
broadcast the hash key to other trusted nodes in the IoT network,
validate the access request based on a solution consensus from the other trusted nodes, and
provide, to the untrusted node, an access token for a user device to access a requested resource within a private domain, after validating the access request based on the solution consensus; and
when the access request is identified as from a trusted node:
confirm mutual trust with the trusted node via an encrypted key exchange,
validate the access request based on the mutual trust with the trusted node, and
provide, to the trusted node, the access token for the user device to access the requested resource within the private domain, after validating the access request based on the mutual trust.

10. The one or more network devices of claim 9, wherein the one or more network devices consist of computing devices within a private domain.

11. The one or more network devices of claim 9, wherein the one or more processors are further configured to execute the instructions to:
receive, from the user device, a login request, wherein the login request includes credentials of the user;
authenticate the user based on the credentials;
log a record of the authenticating to create an updated access list; and
post the updated access list to the IoT network.

12. The one or more network devices of claim 11, wherein the access list includes a timestamp and a link to a previous version of the access list.

13. The one or more network devices of claim 9, wherein the IoT network includes a combination of nodes in a private domain and other nodes in a public domain.

14. The one or more network devices of claim 9, wherein, when conducting the encrypted key exchange, the one or more processors, use a first authentication protocol that is different than a second authentication protocol used by the node to authenticate the user.

15. A non-transitory computer-readable medium containing instructions executable by at least one processor, the computer-readable medium comprising one or more instructions to:
receive, from a node in an Internet-of-Things (IoT) network, an access request for a user authenticated via the node;
identify the access request as from either of a trusted node or an untrusted node in the IoT network;
when the access request is identified as from an untrusted node:
identify a hash key for the access request, wherein the hash key is derived from an access list for the IoT network,
broadcast the hash key to other trusted nodes in the IoT network,
validate the access request based on a solution consensus from the other trusted nodes, and
provide, to the untrusted node, an access token for a user device to access a requested resource within a private domain, after validating the access request based on the solution consensus; and
when the access request is identified as from a trusted node:
confirm mutual trust with the trusted node via an encrypted key exchange,
validate the access request based on the mutual trust with the trusted node, and
provide, to the trusted node, the access token for the user device to access the requested resource within the private domain, after validating the access request based on the mutual trust.

16. The non-transitory computer-readable medium of claim 15, further comprising one or more instructions to:
receive, from the user device, a login request, wherein the login request includes credentials of the user;
authenticate the user based on the credentials;
log a record of the authenticating to create an updated access list; and
post the updated access list to the IoT network.

17. The non-transitory computer-readable medium of claim 16, wherein the updated access list includes a timestamp.

18. The non-transitory computer-readable medium of claim 17, wherein the updated access list includes a link to a previous version of the access list.

19. The non-transitory computer-readable medium of claim 15, wherein the IoT network includes a combination of nodes in a private domain and other nodes in a public domain.

20. The non-transitory computer-readable medium of claim 15, wherein the encrypted key exchange uses a second authentication protocol that is different than the first authentication protocol.

* * * * *